(12) United States Patent
Williams et al.

(10) Patent No.: US 8,350,546 B2
(45) Date of Patent: Jan. 8, 2013

(54) HIGH VOLTAGE SEPIC CONVERTER

(75) Inventors: Richard K. Williams, Cupertino, CA (US); Kevin D'Angelo, Santa Clara, CA (US); Charles Coles, Milpitas, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 62 days.

(21) Appl. No.: 11/933,402

(22) Filed: Oct. 31, 2007

(65) Prior Publication Data

US 2009/0045788 A1    Feb. 19, 2009

Related U.S. Application Data

(60) Provisional application No. 60/956,008, filed on Aug. 15, 2007.

(51) Int. Cl.
*G05F 1/10* (2006.01)
*G05F 1/652* (2006.01)
*G05F 1/44* (2006.01)

(52) U.S. Cl. ......... 323/282; 323/284; 323/222; 323/226

(58) Field of Classification Search .................. 323/282, 323/284, 285, 286, 222, 226, 225
See application file for complete search history.

(56) References Cited

U.S. PATENT DOCUMENTS

| | | | | |
|---|---|---|---|---|
| 5,627,460 | A * | 5/1997 | Bazinet et al. | 323/288 |
| 6,476,589 | B2 * | 11/2002 | Umminger et al. | 323/282 |
| 7,045,993 | B1 * | 5/2006 | Tomiyoshi | 323/224 |
| 7,541,795 | B1 * | 6/2009 | Smith et al. | 323/285 |
| 7,598,715 | B1 * | 10/2009 | Hariman et al. | 323/271 |

* cited by examiner

*Primary Examiner* — Bao Q Vu

(57) ABSTRACT

A SEPIC converter with over-voltage protection includes a high-side inductor that connects a node $V_w$ to a node $V_x$. The node $V_x$ is connected, in turn to ground by a power MOSFET. The node $V_x$ is also connected to a node $V_y$ by a first capacitor. The node $V_y$ is connected to ground by a low-side inductor. A rectifier diode further connects the node $V_y$ and a node $V_{out}$ and an output capacitor is connected between the node $V_{out}$ and ground. A PWM control circuit is connected to drive the power MOSFET. An over-voltage protection MOSFET connects an input supply to the PWM control circuit and the node $V_w$. A comparator monitors the voltage of the input supply. If that voltage exceeds a predetermined value $V_{ref}$ the comparator output causes the over-voltage protection MOSFET to disconnect the node $V_w$ and the PWM control circuit from the input supply.

10 Claims, 3 Drawing Sheets

HIGH VOLTAGE SEPIC CONVERTER

BACKGROUND OF THE INVENTION

Most DC to DC switching voltage regulators such as the Buck converter and boost converter are capable of only regulating a voltage above or below a given input but not capable of both step up and step down regulation. A SEPIC (single ended primary inductor converter) is a DC-DC converter which allows the output voltage to be greater than, less than, or equal to the input voltage. The output voltage of the SEPIC is controlled by the duty cycle of the control transistor. The largest advantage of a SEPIC over the buck-boost converter is a non-inverted output (positive voltage). SEPICs are useful in applications where the battery voltage can be above and below the regulator output voltage. For example, a single Lithium ion battery typically has an output voltage ranging from 4.2 Volts to 3 Volts. If the accompanying device requires 3.3 Volts, then the SEPIC would be effective since the battery voltage can be both above and below the regulator output voltage. Other advantages of SEPICs are input/output isolation and true shutdown mode: when the switch is turned off output drops to 0 V.

As shown in FIG. 1 a prior art SEPIC converter 1 comprises a PWM control circuit 2, N-channel power MOSFET 3 with intrinsic drain-to-source diode 4, high-side inductor 5, capacitor 6, low-side inductor 7, rectifier diode 8 and output capacitor 9 powering load 10. Operation comprises repeatedly magnetizing inductor 5 whenever MOSFET 3 is in its ON and conducting state and transferring energy to output capacitor 9 and load 10 in alternating phases.

During operation, the node voltage Vx peaks at a voltage $(V_{IN}+V_{OUT})$. The $BV_{DSS}$ breakdown of MOSFET 3 and diode 4 must exceed this peak voltage with some reserve.

The converter as shown cannot survive an over-voltage condition because no means exists to stop the switching operation of MOSFET 3. Instead of limiting the maximum input voltage, converter 1 continues to operate at any input voltage until the drain voltage on MOSFET 3 exceeds safe limits and damages the device. In addition to this inability to survive high input voltages, PWM controller 2 contains low-voltage control circuitry which cannot operate when powered directly from a high voltage input.

The circuit as shown also suffers from the lack of a true load disconnect. Current sensing is also problematic since there is no convenient means to detect the input current in inductor 5.

What is needed is a SEPIC converter offering high-voltage operation up to some safe level below the rating of the power MOSFET, a means to inhibit switching operation under excessive input voltage conditions, the ability to disconnect the load from the input, and a means to detect the input current either to implement current mode control, to prevent over-current conditions, or ideally both.

SUMMARY OF THE INVENTION

The present invention provides a family of SEPIC converters that overcome the disadvantages of the prior art. A basic building block of this family is the generic SEPIC converter shown in FIG. 1. This converter includes a high-side inductor that connects a node $V_w$ to a node $V_x$. The node $V_x$ is connected, in turn to ground by a power MOSFET. The node $V_x$ is also connected to a node $V_y$ by a first capacitor. The node $V_y$ is connected to ground by a low-side inductor. A rectifier diode further connects the node $V_y$ and a node $V_{out}$ and an output capacitor is connected between the node $V_{out}$ and ground.

A PWM control circuit is connected to drive the power MOSFET. The PWM control circuit turns the power MOSFET ON an OFF in a repeating pulse-width-modulation pattern. The duty cycle of the power MOSFET is varied in proportion to the voltage at the node $V_{out}$ to maintain the output of the SEPIC converter within regulation. Whenever the power MOSFET is ON, current from the input supply magnetizes the high-side inductor. When the power MOSFET subsequently turns OFF, the energy stored in the magnetic field of the inductor is transferred to the output capacitor. A load connected over the output capacitor is powered in this fashion.

To this basic SEFIC topology just described, a first embodiment of the present invention adds circuitry for over-voltage protection. Specifically, this embodiment uses over-voltage protection MOSFET to connect the input supply to the PWM control circuit and the node $V_w$. The over-voltage protection MOSFET is driven by the output of a comparator. The comparator is connected to monitor the difference between a predetermined reference voltage $V_{ref}$ and the voltage of the input supply. If the voltage of the input supply exceeds the predetermined value $V_{ref}$ the comparator output causes the over-voltage protection MOSFET to disconnect the node $V_w$ and the PWM control circuit from the input supply. In this way, a SEPIC converter is provided that can survive input voltages that would otherwise damage the power MOSFET or PWM control circuit.

A second embodiment of the present invention provides a high-voltage SEPIC converter. For this embodiment (once again, based on the topology described above) a linear regulator (typically, an LDO) is used to supply current from the input supply to the PWM control circuit. In this way, the voltage applied to the PWM control circuit never exceeds the regulated output of the linear regulator and the SEPIC converter can survive input voltages that would otherwise damage the PWM control circuit.

A third embodiment of the present invention provides a high-voltage SEPIC with over-voltage protection. This embodiment includes all of the elements of the high-voltage SEPIC just described. To add over-voltage protection, an AND gate is added to drive the power MOSFET. The inputs to the AND gate are the output of the PWM control circuit and the output of a comparator. The comparator is connected to monitor the difference between a predetermined reference voltage $V_{ref}$ and the voltage of the input supply. If the voltage of the input supply exceeds the predetermined value $V_{ref}$ the comparator output causes the AND gate to disable the output of the PWM control circuit. In turn, this causes the power MOSFET to turn OFF.

By shutting down the power MOSFET under over-voltage conditions, the SEPIC converter ensures that the drain of the power MOSFET never exceeds the voltage of the input supply. In this way, the power MOSFET is protected in over-voltage conditions. At the same time, the PWM circuit is protected by the LDO as described for the previous embodiment.

A fourth embodiment of the present invention provides a high-voltage SEPIC with over-voltage protection and load disconnect. This embodiment includes all of the elements of the high-voltage SEPIC with over-voltage protection just described. To add load disconnect, current sensing and load disconnect circuitry is added to monitor the current flowing from the input supply to the high-side inductor. The current sensing and load disconnect circuitry includes a P-channel MOSFET connected between the input supply and the high-side inductor. During normal operation, this P-channel device is biased to allow current to pass to the high-side inductor.

The current through the P-channel MOSFET is monitored using a current mirroring technique. This produces an over-current signal that is connected as an input to the AND gate (in this implementation the AND gate has three inputs). If current flowing through the P-channel MOSFET exceeds a predetermined value, the over-current signal causes the AND gate to disable the output of the PWM control circuit. In turn, this causes the power MOSFET to turn OFF and protects the SEPIC converter from over-current damage. The use of a P-channel MOSFET to monitor the current to the high-side inductor also means that, by biasing that MOSFET to be OFF, the SEPIC converter may be disconnected from the input supply.

DETAILED DESCRIPTION OF THE PREFERRED EMBODIMENTS

Over-Voltage-Protected SEPIC

Figure 1:
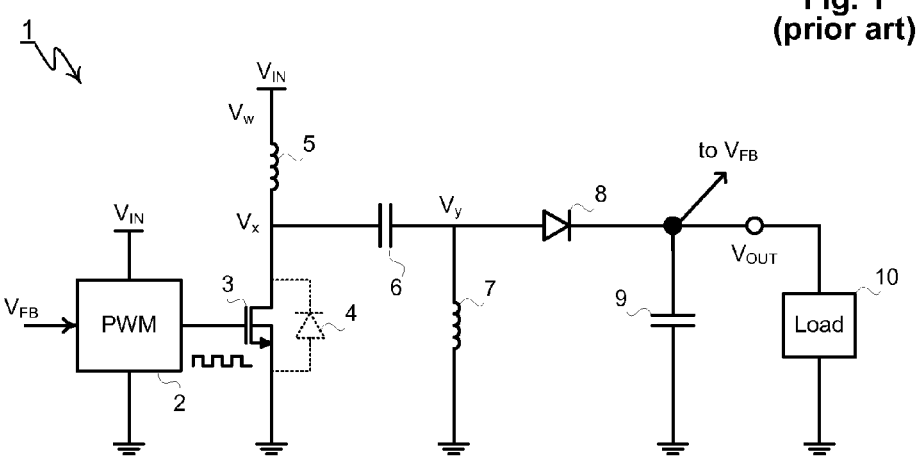
FIG. 1 is a schematic of a conventional SEPIC converter (Prior Art).
Figure 2:
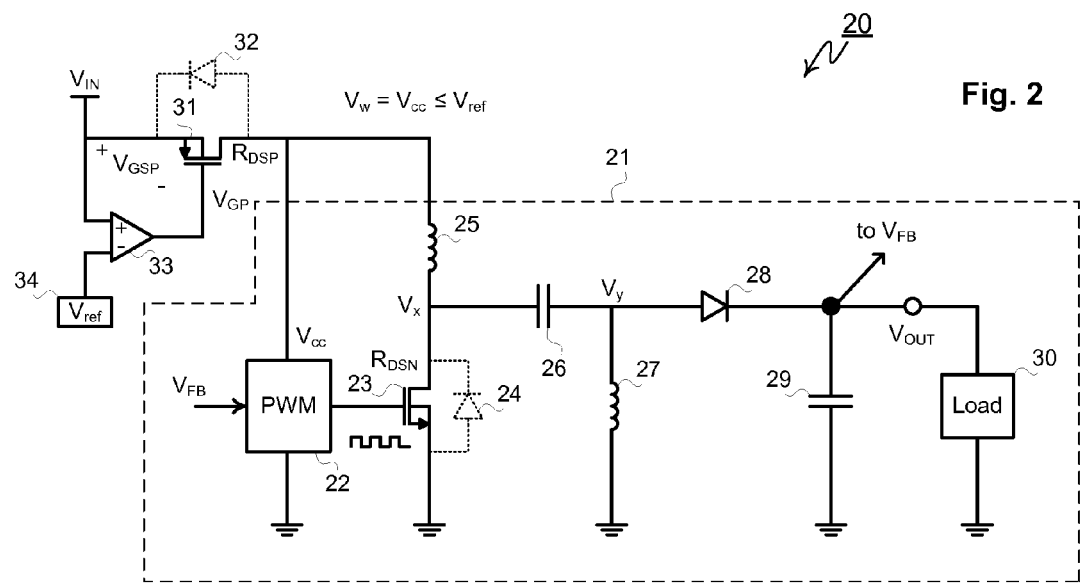
FIG. 2 is a schematic of a SEPIC converter with series over-voltage protection as provided by an embodiment of the present invention.

One means to extend the voltage range of the SEPIC converter is to utilize an over-voltage protection, i.e. OVP, circuit that disconnects the converter from the input in the event the input voltage exceeds a pre-specified value. In converter 20 of FIG. 2, SEPIC converter 21 is protected by P-channel MOSFET 31 controller by comparator 33 which compares the input voltage $V_{IN}$ to a reference voltage $V_{ref}$. Reference voltage 34 may be implemented using a bandgap reference, Zener diode, a series of forward biased diodes or any other well known voltage reference technique, or a scaled multiple of said voltage. P-channel MOSFET 31 includes reverse-biased intrinsic P-N diode 32 with its anode tied to $V_{IN}$ and its cathode connected to the input to converter 21.

SEPIC converter 21 comprises a PWM control circuit 22, N-channel power MOSFET 23 with intrinsic drain-to-source diode 24, high-side inductor 25, capacitor 26, low-side inductor 27, rectifier diode 28 and output capacitor 29 powering load 30. Operation comprises repeatedly magnetizing inductor 25 whenever MOSFET 23 is in its ON and conducting state and transferring energy to output capacitor 29 and load 30 in alternating phases.

Whenever $V_{IN}$ is below $V_{ref}$ the gate of P-channel 31 is pulled down by comparator 33 and P-channel 31 is turned on. The maximum gate to source voltage $V_{GSP}$ cannot exceed the maximum gate rating of the P-channel 31, i.e. $V_{GSP} < |V_{IN} - V_{GP}|$. Accordingly, the $V_{cc}$ input of SEPIC converter 21 is connected to $V_{IN}$ and the converter is operating. Whenever $V_{IN}$ is above $V_{ref}$ an over-voltage condition has occurred and the input $V_{cc}$ of SEPIC converter 21 is disconnected from $V_{IN}$ and allowed to float or alternatively is grounded. The $V_{ref}$ voltage determines the maximum value of $V_{cc}$ powering SEPIC converter 21 and PWM controller 22. PWM controller must therefore utilize devices capable of operating at the maximum allowed $V_{cc}$ voltage, i.e. $V_{ref}$. During operation, the node voltage $V_x$ peaks at a voltage $(V_{IN}+V_{OUT}) < (V_{ref}+V_{OUT})$. The $BV_{DSS}$ breakdown of MOSFET 23 and diode 24 must exceed this peak voltage with some guardband.

As such OVP protection MOSFET 31 protects SEPIC converter 21 but must be rated for the maximum $V_{IN}$ input voltage. The devices used in PWM control circuit 22 must support the same voltage rating. An even higher voltage is imposed on node $V_x$ and across diode 24 of N-channel MOSFET 23. Implementation 20 therefore requires two high voltage MOSFETs, N-channel 23 and P-channel 31 with respective on-resistances $R_{DSN}$ and $R_{DSP}$, to implement an over-voltage protected SEPIC converter. The current capability of the converter is adversely affected by the higher on-resistance of such high voltage devices, i.e. $R_{total}=(R_{DSP}+R_{DSN})$. While the approach of circuit 20 may be used for any input voltage, practically these considerations limit the input voltage to the 12V to 18V range, especially in implementing PWM controller 22.

Another benefit of OVP protected SEPIC converter 20 is its ability to implement the load-disconnect function, simply by turning OFF P-channel MOSFET 31 by biasing its gate to its source potential, i.e. where $V_{GP}=V_{IN}$.

High-Voltage SEPIC

Figure 3:
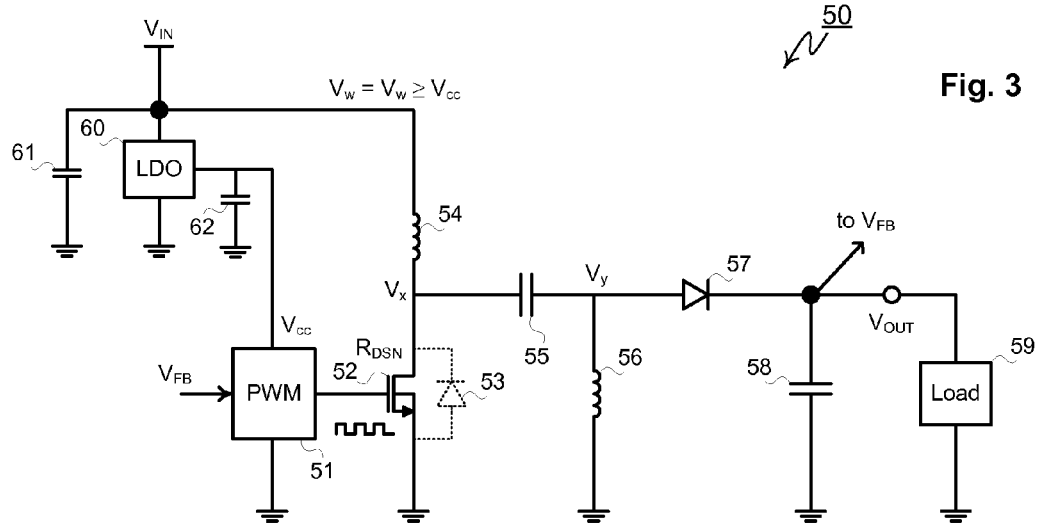
FIG. 3 is a schematic of a high voltage SEPIC without over-voltage protection as provided by an embodiment of the present invention.

Another method to extend the voltage range of the SEPIC converter is to utilize a high voltage low-drop-out linear regulator, or LDO, to protect the control circuitry from high voltages up to a pre-specified value. In SEPIC converter 50 of FIG. 3 linear regulator 60 limits the maximum voltage imposed on PWM controller 51 to some predefined maximum voltage $V_{cc}$, typically 3V or 5V, so that the devices utilized within PWM circuit 51 may comprise only low-voltage devices.

SEPIC converter 50 includes a PWM control circuit 51, N-channel power MOSFET 52 with intrinsic drain-to-source diode 53, high-side inductor 54, capacitor 55, low-side inductor 56, rectifier diode 57 and output capacitor 58 powering load 59. Operation comprises repeatedly magnetizing inductor 54 whenever MOSFET 52 is in its ON and conducting state and transferring energy to output capacitor 58 and load 59 in alternating phases.

As illustrated linear regulator 60 is preferably a low-dropout type, e.g. with a series voltage drop under 200 mV, to extend the operating voltage range of converter 50 to lower input voltage $V_{IN}$. The design of low drop-out linear regulators is well known to one skilled in the art of power electronics. Input and output capacitors 61 and 62 acts as filter capacitors and prevent LDO 60 from oscillating. The benefit of the smaller sized devices is the silicon die area may be reduced compared to the area occupied by high voltage PWM circuit 22 of aforementioned SEPIC converter circuit 20.

While LDO 60 protects PWM controller 51 from high input voltages it does not limit the voltage on the remainder of the converter circuit or on MOSFET 52. Lacking any over-voltage protection circuitry and series disconnect switch, the N-channel MOSFET 52 and diode 53 must be rated to operate up to the maximum input voltage with adequate guard-banding to avoid accidental or momentary avalanche breakdown. During operation the peak $V_x$ voltage is typically $(V_{IN}+V_{OUT})$.

Since only one high voltage MOSFET is present in converter 50, the current capability of the converter is improved in comparison to converter 20, where the total MOSFET resistance is only that of MOSFET 52, i.e. where $R_{total}=(R_{DSN})$. Without over-voltage protection however, the breakdown voltage of MOSFET 52 must be higher than $(V_{IN}+V_{OUT})$. In this approach, the breakdown voltage guard-band of MOSFET 52 increases with increasing input voltage. While the approach of circuit 50 may be used for any input voltage, practically these considerations preferably limit the input voltage to the 18V to 30V range, beyond which the need for excessive voltage guard-banding makes MOSFET 52 unnecessarily large to compensate for its higher resistance.

Without OVP protection, one disadvantage of high-voltage SEPIC converter 50 is its inability to offer the load-disconnect function. As a result the circuit provides no means to disconnect load 59 from $V_{IN}$.

High-Voltage SEPIC with Over-Voltage Protection

Figure 4:
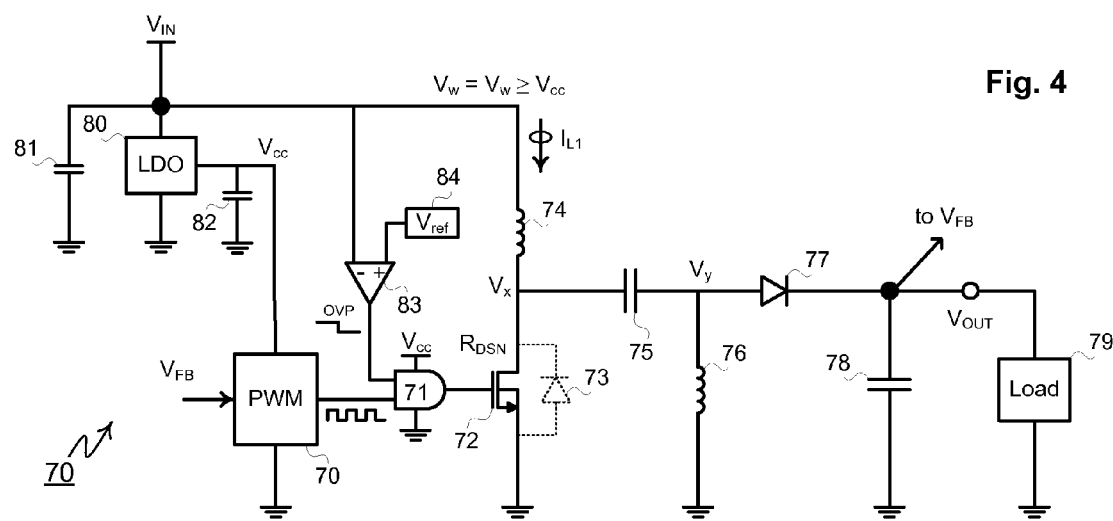
FIG. 4 is a schematic of a high voltage SEPIC with over-voltage protection as provided by an embodiment of the present invention.

An improved SEPIC converter combines the over-voltage protection features of converter 20 with the high voltage capability of converter 50. The resulting OVP protected high-voltage SEPIC converter is illustrated in circuit 69 of FIG. 4. As such, an over-voltage protection circuit 83 in conjunction with a high voltage MOSFET 72 protects the power circuitry while a linear regulator protects the PWM control circuit 70 from high voltages. Unlike in converter 20, OVP protection is achieved without inserting a second high voltage device in the high current path, but instead is achieved by changing the control of the high-voltage rated low-side N-channel MOSFET 70.

Specifically, linear regulator 80 limits the maximum voltage imposed on PWM controller 70 to some predefined maximum voltage $V_{cc}$, typically 3V or 5V, so that the devices utilized within PWM circuit 70 may comprise only low-voltage devices. Linear regulator 80 is preferably a low-dropout type, e.g. with a series voltage drop under 200 mV, to extend the operating voltage range of converter 69 to lower input voltages $V_{IN}$. The design of low drop-out linear regulators is well known to one skilled in the art of power electronics. Input and output capacitors 81 and 82 acts as filter capacitors and prevent LDO 80 from oscillating. The benefit of the smaller sized devices is the silicon die area may be reduced compared to the area occupied by high voltage PWM circuit 22 of aforementioned SEPIC converter circuit 20.

For over-voltage protection SEPIC converter 69 achieves OVP capability by shutting OFF high-voltage MOSFET 72 whenever an over-voltage condition is detected. The maximum operating voltage of high voltage N-channel MOSFET 72 is set by OVP reference voltage 84. Comparing the input voltage $V_{IN}$ to the reference voltage $V_{ref}$ at the point of over-voltage shutdown when $V_{IN}>V_{ref}$, comparator 83 inhibits PWM control of MOSFET 72 with logic AND gate 71. In such an event PWM controller 70 no longer determines the turn ON and OFF of MOSFET 71. The maximum $V_x$ voltage at this moment is $(V_{ref}+V_{OUT})$ plus some guard banding. Above this voltage, converter 69 no longer functions and the maximum voltage imposed on the drain of OFF state MOSFET 72 is simply $V_{IN}$.

So in improved SEPIC converter 69, the voltage capability of MOSFET 72 and diode 75 needed for operation is used to achieve the OVP function without adding extra series resistance to the high-current power path. Comparator 83 is used to monitor the input voltage $V_{IN}$ and compare it to an over-voltage reference set to a voltage $V_{ref}$. Reference voltage 84 may be implemented using a bandgap reference, Zener diode, a series of forward biased diodes or any other well known voltage reference technique, or a scaled multiple of said voltage.

The remaining elements of SEPIC converter 69 comprises a PWM control circuit 70, N-channel power MOSFET 72 with intrinsic drain-to-source diode 73, high-side inductor 74, capacitor 75, low-side inductor 76, rectifier diode 77 and output capacitor 78 powering load 79. Normal operation comprises repeatedly magnetizing inductor 74 whenever MOSFET 72 is in its ON and conducting state and transferring energy to output capacitor 78 and load 79 in alternating phases.

Since only one high voltage MOSFET is present in converter 69, the current capability of the converter is improved in comparison to converter 20, where the total MOSFET resistance is only that of MOSFET 72, i.e. where $R_{total}=(R_{DSN})$. With over-voltage protection, the breakdown voltage of MOSFET 72 must be only slightly higher than $(V_{ref}+V_{OUT})$ offering the need for less voltage guard banding and on-resistance penalty. Therefore, the approach of circuit 69 may be used for any input voltage with minimal impact on conversion efficiency.

Like converter 50, without a series P-channel MOSFET, OVP protected high-voltage SEPIC converter 69 is unable to offer the load-disconnect function. As a result the circuit provides no means to disconnect load 79 from $V_{IN}$.

High-Voltage SEPIC with Over-Voltage Protection and Load Disconnect

As another embodiment of this invention, improved SEPIC converter 80 combines the over-voltage protection features and load disconnect capability of converter 20 with the high voltage capability of converter 50. The resulting OVP protected high-voltage SEPIC converter is illustrated in circuit 90 of FIG. 5 including current sensing and load disconnect circuitry 106.

As such, an over-voltage protection comparator 104 in conjunction with a high voltage MOSFET 93 protects the power circuitry while a linear regulator 102 protects the PWM control circuit 91 from high voltages. Similar to converter 69 and unlike in converter 20, OVP protection is achieved without inserting a second high voltage device in the high current path, but instead is achieved by changing the control of the high-voltage rated low-side N-channel MOSFET 93.

To avoid the need for substantial high voltage circuitry, linear regulator 102 limits the maximum voltage imposed on PWM controller 91 to some predefined maximum voltage $V_{cc}$, typically 3V or 5V, so that the devices utilized within PWM circuit 91 may comprise only low-voltage devices. Linear regulator 80 is preferably a low-drop-out type, e.g. with a series voltage drop under 200 mV, to extend the operating voltage range of converter 90 to lower input voltages $V_{IN}$. The design of low drop-out linear regulators is well known to one skilled in the art of power electronics. Input and output capacitors 101 and 103 acts as filter capacitors and prevent LDO 102 from oscillating. The benefit of the smaller sized devices is the silicon die area may be reduced compared to the area occupied by high voltage PWM circuit 22 of aforementioned SEPIC converter circuit 20.

For over-voltage protection SEPIC converter 90 achieves OVP capability by shutting OFF high-voltage MOSFET 93 whenever an over-voltage condition is detected. The maximum operating voltage of high voltage N-channel MOSFET 93 is set by OVP reference voltage 105. Comparing the input voltage $V_{IN}$ to the reference voltage $V_{ref}$ at the point of over-voltage shutdown when $V_{IN}>V_{ref}$, comparator 104 inhibits PWM control of MOSFET 93 with triple-input logic AND gate 92. In such an event PWM controller 91 no longer determines the turn ON and OFF of MOSFET 93. The maximum $V_x$ voltage at this moment is $(V_{ref}+V_{OUT})$ plus some guard banding. Above this voltage, converter 90 no longer functions and the maximum voltage imposed on the drain of OFF state MOSFET 93 is simply $V_{IN}$.

In improved SEPIC converter 90 the voltage capability of MOSFET 93 and diode 94 needed for operation is used to achieve the OVP function without adding extra series resistance to the high-current power path. Comparator 104 is used to monitor the input voltage $V_{IN}$ and compare it to an over-voltage reference set to a voltage $V_{ref}$. Reference voltage 105 may be implemented using a bandgap reference, Zener diode, a series of forward biased diodes or any other well known voltage reference technique, or a scaled multiple of said voltage.

Current sensing is achieved in improved SEPIC converter 90 using current sensing and load disconnect circuitry 106, utilizing a low-loss current sensing technique described in a pending U.S. patent application entitled "Cascode Current Sensor for Discrete Power Semiconductor Devices" by R. K. Williams. That disclosure is incorporated in this document by reference. Rather than using a resistor as a current sense element, low-voltage low-resistance P-channel MOSFET 107 with intrinsic reverse biased P-N diode 108 is inserted in the path of the input current flowing in inductor 95. Under normal operation the gate voltage $V_{GP}$ of P-channel 107 is pulled down by gate buffer 109 to fully enhance the MOSFET into a low-resistance state with a resistance $R_{DSP}$ for a given area substantially lower than that of high-voltage P-channel 31 described previously in FIG. 20.

The maximum gate to source voltage $V_{GSP}$ of P-channel 108 in its ON condition cannot exceed the maximum gate rating of the P-channel 107, i.e. $V_{GSP} < |V_{IN} - V_{GP}|$ as determined by the output of gate buffer 109. When MOSFET 107 is ON and conducting, amplifier or comparator 110 is used to determine the input current flowing into inductor 95. By using a mirror technique the current in MOSFET 107 can be accurately determined.

During normal operation, the gate buffer 109 biases MOSFET 107 into a low-resistance conducting state. Amplifier or comparator 110 accurately detects the current flowing in conducting MOSFET 107 and outputs a signal. If this signal is analog, representing a measurement of inductor 95 current, the information may be used to implement current mode control of PWM block 91.

Figure 5:
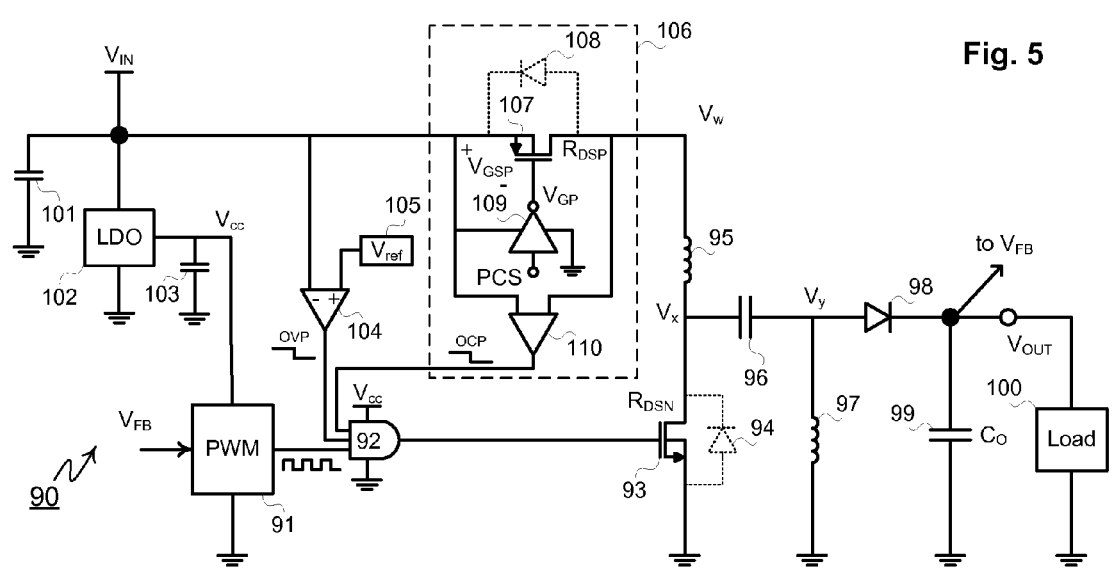
FIG. 5 is a schematic of a high voltage SEPIC with over-voltage protection, current sensing, over-current protection and true load disconnect as provided by an embodiment of the present invention.

In another implementation shown in FIG. 5, comparator 110 has a digital output representing over-current protecting shutdown or OCS, and used as one input to triple NAND gate 110. Only when converter 90 has an input voltage $V_{IN}$ below a specified preset level and the measured current in MOSFET 107 does not cause comparator 110 to flip states as an over-current condition, then the output of PWM controller 91 controls the turning ON and OFF of N-channel MOSFET 93. Accordingly, the $V_w$ input of SEPIC converter 90 is connected to $V_{IN}$ and the converter is operating.

The remaining elements of SEPIC converter 90 comprises a PWM control circuit 91, N-channel power MOSFET 93 with intrinsic drain-to-source diode 94, high-side inductor 95, capacitor 96, low-side inductor 97, rectifier diode 98 and output capacitor 99 powering load 100. Normal operation comprises repeatedly magnetizing inductor 95 whenever MOSFET 93 is in its ON and conducting state and transferring energy to output capacitor 99 and load 100 in alternating phases.

Since only one high voltage MOSFET 93 plus one low-voltage MOSFET 107 is present in converter 90, the current capability of the converter is improved in comparison to converter 20, where the total MOSFET resistance is that of high-voltage MOSFET 93 plus the resistance of low-voltage MOSFET 107, i.e. where $R_{total} = (R_{DSP} + R_{DSN})$. With over-voltage protection, the breakdown voltage of MOSFET 93 must be only slightly higher than $(V_{ref} + V_{OUT})$ offering the need for less voltage guard banding and on-resistance penalty. Therefore, the approach of circuit 90 may be used for any input voltage with minimal impact on conversion efficiency.

By including series low voltage P-channel MOSFET 107, the disclosed OVP protected high-voltage SEPIC converter 90 is able to offer the load-disconnect function whereby the circuit provides a means to disconnect load 100 from $V_{IN}$. Load disconnect is controlled by P-type current sense PCS signal, the input to gate buffer 109.

What is claimed is:

1. A SEPIC converter with over-voltage protection that comprises:
    a high-side inductor connected between a node $V_w$ and a node $V_x$;
    a power MOSFET connected in series between the node $V_x$ and ground;
    a first capacitor connected between the node $V_x$ and a node $V_y$;
    a low-side inductor connected between the node Vy and ground;
    a rectifier diode connected between the node $V_y$ and a node $V_{out}$;
    an output capacitor connected between the node $V_{out}$ and ground;
    a PWM control circuit connected to drive the gate of the power MOSFET;
    an over-voltage protection MOSFET connected to control the flow of current from an input supply to the node $V_w$ and the PWM control circuit; and
    a comparator connected to drive the gate of the over-voltage protection MOSFET so that the node $V_w$ and the PWM control circuit are disconnected from the input supply when the voltage of the input supply exceeds a predetermined value $V_{ref}$.

2. A SEPIC converter with over-voltage protection that comprises:
    a high-side inductor connected between an input supply and a node $V_x$;
    a power MOSFET connected in series between the node $V_x$ and ground;
    a first capacitor connected between the node $V_x$ and a node $V_y$;
    a low-side inductor connected between the node Vy and ground;
    a rectifier diode connected between the node $V_y$ and a node $V_{out}$;
    an output capacitor connected between the node $V_{out}$ and ground;
    a PWM control circuit connected to drive the gate of the power MOSFET; and
    a linear regulator connected to control the flow of current from the input supply to the PWM control circuit.

3. A SEPIC converter as recited in claim 2 that further comprises:
    an AND gate connected between the PWM control circuit and the power MOSFET; and
    a comparator generating an over-voltage signal as a function of the voltage of the input supply, the over-voltage signal connected to an input of the AND gate so that the AND gate prevents the PWM control circuit from driving the power MOSFET when the voltage of the input supply exceeds a predetermined value $V_{ref}$.

4. A SEPIC converter as recited in claim 3 that further comprises: a current sensing circuit configured to generate an over-current signal as a function of the magnitude of the current passing from the input supply to the high-side inductor, the over-current signal connected to an input of the AND gate so that the AND gate prevents the PWM control circuit from driving the power MOSFET when the magnitude of the current passing to the high-side inductor exceeds a predetermined value.

5. A SEPIC converter as recited in claim 4 in which the current sensing circuit further comprises:
   a P-channel MOSFET connected between the input supply and the high-side inductor; and
   a comparator connected to generate the over-current signal as a function of the voltage drop over the P-channel MOSFET.

6. A method for controlling a SEPIC converter, where the SEPIC converter includes a high-side inductor connected between a node $V_w$ and a node $V_x$; a power MOSFET connected in series between the node $V_x$ and ground; a first capacitor connected between the node $V_x$ and a node $V_y$; a low-side inductor connected between the node Vy and ground; a rectifier diode connected between the node $V_y$ and a node $V_{out}$; an output capacitor connected between the node $V_{out}$ and ground; a PWM control circuit connected to drive the gate of the power MOSFET; the method comprising:
   controlling the flow of current from an input supply to the node $V_w$ and the PWM control circuit with an over-voltage protection MOSFET; and
   driving the gate of the over-voltage protection MOSFET so that the node $V_w$ and the PWM control circuit are disconnected from the input supply when the voltage of the input supply exceeds a predetermined value $V_{ref}$.

7. A method for controlling a SEPIC converter, where the SEPIC converter includes a high-side inductor connected between a node $V_w$ and a node $V_x$; a power MOSFET connected in series between the node $V_x$ and ground; a first capacitor connected between the node $V_x$ and a node $V_y$; a low-side inductor connected between the node Vy and ground; a rectifier diode connected between the node $V_y$ and a node $V_{out}$; an output capacitor connected between the node $V_{out}$ and ground; a PWM control circuit connected to drive the gate of the power MOSFET; a method comprising:
   controlling the flow of current from the input supply to the PWM control circuit using a linear regulator.

8. A method as recited in claim 7 that further comprises:
   generating an over-voltage signal as a function of the voltage of the input supply; and
   preventing the PWM control circuit from driving the power MOSFET when the over-voltage signal indicates that voltage of the input supply has exceeded a predetermined value $V_{ref}$.

9. A method as recited in claim 8 that further comprises:
   generating an over-current signal as a function of the magnitude of the current passing from the input supply to the high-side inductor; and
   preventing the PWM control circuit from driving the power MOSFET when the over-current signal indicates that the magnitude of the current passing from the input supply to the high-side inductor has exceeded a predetermined value.

10. A method as recited in claim 8 in which the SEPIC converter includes a P-channel MOSFET connected between the supply voltage and the high-side inductor and in which the method further comprises:
   biasing the P-channel MOSFET so that current flows from the input supply to the high-side inductor; and
   generating the over-current signal as a function of the voltage drop over the P-channel MOSFET.

* * * * *